UNITED STATES PATENT OFFICE.

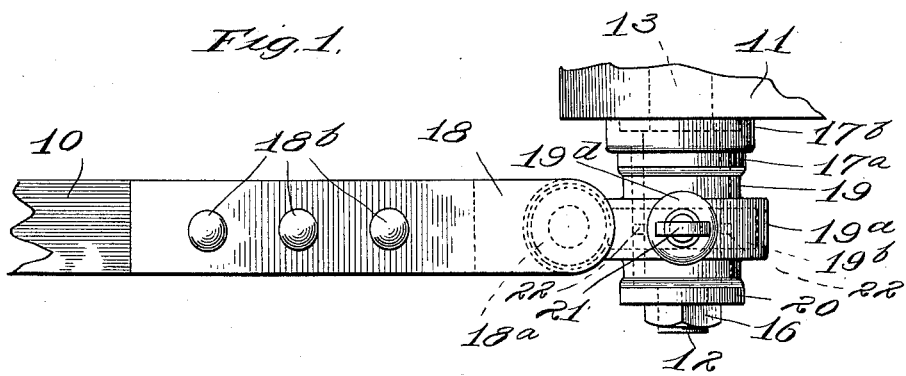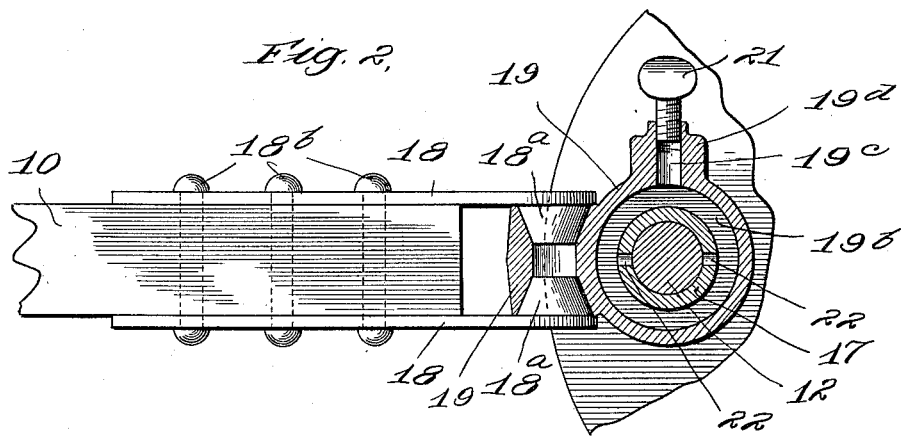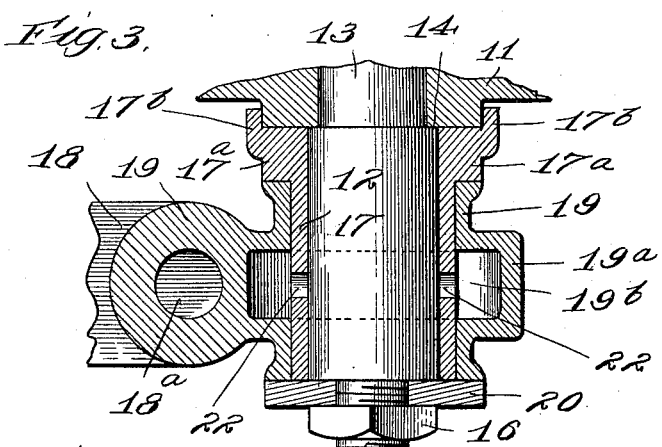

JOHN H. DOWNING, OF STILLWATER, MINNESOTA, ASSIGNOR TO THE STATE OF MINNESOTA.

PITMAN CONNECTION FOR HARVESTING-MACHINES.

1,029,533.  Specification of Letters Patent.  Patented June 11, 1912.

Application filed February 25, 1911. Serial No. 610,710.

*To all whom it may concern:*

Be it known that I, JOHN H. DOWNING, a subject of the King of England, now residing at Stillwater, in the county of Washington and State of Minnesota, have invented certain new and useful Improvements in Pitman Connections for Harvesting-Machines, of which the following is a full, clear, and exact specification.

The invention relates to pitmen connections for harvesting machines, and particularly to the connection at the fly-wheel or crank wheel end of the pitman.

The object of the invention is to provide an improved pitman connection for connecting the fly-wheel end of a harvester or mower pitman to the crank pin, which shall be simple in construction, efficient in operation, and provided with improved means for receiving and indefinitely retaining a supply of lubricant and gradually supplying the same to the frictional surfaces between the crank pin and the bearing portions of the connection.

To the attainment of these ends and the accomplishment of certain other new and useful objects which will subsequently appear, the invention consists in the features of novelty illustrated in the drawings forming a part of this specification, set forth in the subjoined specification, and finally pointed our more specifically in the appended claims.

In the said drawings—Figure 1 is a plan view of the improved pitman connection, showing the same in position on the crank pin or fly-wheel, portions of both pitman and fly-wheel being broken away. Fig. 2 is a view in elevation of a portion of the pitman adjacent the fly-wheel, the parts of the connection being in section in order to disclose the construction. Fig. 3 is an enlarged plan view, all the parts being shown in section with the exception of the crank pin.

It will be apparent that the improved pitman connection herein shown, described and claimed is capable of use in any desired form of pitmen for harvesting machines, that is, pitmen formed either of metal or of wood with metallic connections at the knife and fly-wheel or crank pin ends. In the present embodiment of the invention it is shown applied to a pitman of the wood type, the wood body thereof being indicated by the reference character 10.

11 indicates the fly-wheel of the harvesting or mowing machine, and 12 the crank-pin carried thereby eccentric to the pivotal shaft on which the fly-wheel is concentrically mounted, such shaft not being illustrated in the drawings as it forms no part of the invention. The crank-pin 12 may be secured to the fly-wheel in any desired manner as by forcing the reduced portion 13 thereof into a hole in the fly-wheel and securing the same in position either by upsetting the reduced extremity of the pin or in any other desirable or well known manner. The bearing portion of the crank pin 12 being larger than the reduced portion 13 which enters the eccentric hole in the fly-wheel, a shoulder is formed on the crank pin, as indicated at 14, abutting against the fly-wheel when the crank-pin is in position. The outer extremity of the crank-pin 12 is reduced and threaded in order to take the retaining nut 16.

17 is a bushing being adapted to fit closely around the cylindrical bearing portion of the crank-pin 12, and in length extending from end to end of the uniform cylindrical portion of the crank-pin, the same being the body thereof which extends from the abutment 14 to the outer extremity of the bearing portion of the pin or flush with the reduced and threaded portion thereof. The inner or fly-wheel end of the bushing 17 is provided with the enlarged circumferential portion 17ª, one side of which forms an enlarged bearing surface against that portion of the fly-wheel immediately surrounding the crank pin, thereby increasing the bearing surface and consequently the life of the bushing. The bushing 17 may be formed of any suitable material adapted to be used for bushings or bearings. It is preferred that it be formed of a different metal from that of the crank-pin, and since the crank-pin is usually of steel it is preferred that the bushing 17 be formed of brass or suitable alloy.

It has been quite common to form the entire pitman connection exclusive of the straps 18 of brass or other suitable alloy for bearings, but this is objectionable because such materials are usually more expensive than gray iron, for example. It is also desirable that the bearing member proper exclusive of bushing be of a metal having sufficient consistency to withstand the pounding and various forms of thrusts due to the connection of the bearing with the retaining straps 18, which are shown in the illustrations riveted as indicated at 18$^b$ to the wood pitman 10 and provided with the coöperating conical lugs or extensions 18$^a$ engaging coöperating conical recesses in the bearing block proper. This last mentioned member is indicated by the reference character 19 and is preferably formed of cast iron and so may be cheaply produced in the irregular form shown and at the same time have the quality of resisting the pounding and thrusts imposed thereon without being seriously worn or distorted. The bearing block 19 extends from the outer edge of the enlarged portion 17$^a$ of the bushing to the extreme outer end of the bushing itself, where it terminates flush with the bushing and with the outer extremity of the bearing surface of the crank-pin, thus making it possible to secure both bushing and the cast bearing 19 in their normal working positions by means of the washer 20, which is secured over the reduced threaded portion 15 of the crank-pin by the nut 16.

About midway of the extremities of the bearing block 19 a circumferential housing 19$^a$ is formed, which preferably has sufficient dimensions to secure on the interior thereof a circumferential cavity or oil pocket 19$^b$ bounded by the housing 19$^a$ and the bushing 17. This circumferential cavity or oil pocket 19$^b$ is therefore closed to retain a considerable quantity of oil, being provided only with the filling duct 19$^c$, which extends through the boss 19$^d$ on the top of the bearing block from the exterior and opens into the cavity or oil pocket 19$^b$, being adapted to be closed by the removable threaded plug 21 adapted to coöperate with the threaded upper end of the filling duct 19$^c$.

The bushing 17 is provided with one or more feed vents to allow the oil to reach the bearing surface 12 of the crank pin. These feed vents are preferably two in number and located as shown most clearly in Figs. 2 and 3, being indicated by the reference characters 22, and situated at the sides of the circumferential portion of the crank-pin and midway between the top and bottom thereof. This construction, it will be seen, permits of a considerable quantity of oil, about one-half of the capacity of the circumferential oil cavity 19$^b$, to be normally held within the circumferential cavity without any avenue of escape until the oil is splashed above the level of the vents 22 by the movement of the pitman. In pitman connections as heretofore constructed this bearing on the crank-pin has been the source of much trouble because of the difficulty of properly lubricating the same. There has generally been no provision made for retaining more than a small quantity of oil in the passages leading to the bearing, and when the machine is in operation this small quantity of oil is soon thrown from the bearing by reason of the centrifugal force of the bearing since the crank-pin 12 is eccentric to the axis of rotation of the flywheel, so that while the operator of the machine may frequently lubricate this bearing the oil or other lubricant would not be retained for but a very short time and the bearing would run for the greater part of any interval almost entirely without any lubricant whatever, causing the bearing to heat and wear.

The bushing immediately surrounding the crank-pin has heretofore been made of brass or other alloy relatively expensive, and because of the difficulty of lubricating the parts these bushings have worn out very rapidly, entailing one of the greatest expenses in keeping a mowing or harvesting machine in repair. By reason of the closed circumferential oil cavity 19$^b$ by my improved construction it is possible to retain oil in this bearing for a considerable time, and if desirable the cavity may be partially filled with some suitable retaining fiber, as wool and the like, commonly used to assist in the retention of lubricants in bearings, although I do not illustrate such fiber in the drawings as its use is common and well known. However, with the use of my improved bearing which is normally closed with the exception of the feeding vents 22 leading to the bearing surface of the crank-pin, it is found that the use of the fiber within the lubricating chamber is not necessary.

In the manufacture and assembly of the parts it is desirable that the brass or alloy bushing 17 should be a close fit, preferably a drive fit in the bearing block 19. This insures a closure between the bushing and the walls of the housing 19$^a$ and renders the circumferential cavity or oil pocket 19$^b$ proof against the leakage of oil.

In order that the invention might be fully understood the details of the preferred embodiment thereof have been thus specifically described, but it is not desired to be limited to the exact details of construction since many modifications thereof may be made without departing from the purpose and spirit of the invention.

What I claim is:

In a pitman connection for harvesting machines, the combination with a crank wheel and a pitman, of a crank pin secured to the said crank wheel eccentric to the axis of rotation thereof, there being a bearing surface formed on the said crank wheel circumferentially of the crank pin adjacent the inner end of the bearing surface thereof, a bearing secured to the pitman and sleeved over the crank pin, said bearing comprising an inner bushing of material having suitable frictional qualities and being uniformly cylindrical throughout the major portion of its length and having a flanged portion of increased diameter at its extreme inner end whereby a covered bearing surface of increased thickness is provided at its inner extremity to coöperate with the said bearing surface formed on the crank wheel for taking end thrust on the bearing, and a bearing block secured to the pitman and sleeved over the bushing, its inner extremity in contact with the shoulder formed by the increased diameter portion at the inner extremity of the bushing, its outer extremity being flush with the outer extremity of the bushing, there being a circumferential cavity or oil pocket formed in the bearing block and normally closed by the bushing, a filling duct in the bearing block, and a feed vent or vents in the bushing communicating between said cavity or oil pocket and the bearing surface of the crank pin, and means carried by the outer extremity of the crank pin for securing the parts of the said bearing in their operative positions on the crank pin said means extending beyond the ends of both bearing block and bushing.

In testimony whereof I have signed my name to this specification, in the presence of two subscribing witnesses, on the 21st day of February A. D. 1911.

JOHN H. DOWNING.

Witnesses:
H. W. DAVIS,
S. D. PORTER.

---

Copies of this patent may be obtained for five cents each, by addressing the "Commissioner of Patents, Washington, D. C."